US008047106B2

(12) United States Patent
Chang

(10) Patent No.: US 8,047,106 B2
(45) Date of Patent: Nov. 1, 2011

(54) WOOD WORKING LATHE

(76) Inventor: Lee-Cheng Chang, Taichung (TW)

( * ) Notice: Subject to any disclaimer, the term of this patent is extended or adjusted under 35 U.S.C. 154(b) by 615 days.

(21) Appl. No.: 12/193,801

(22) Filed: Aug. 19, 2008

(65) Prior Publication Data

US 2010/0043607 A1 Feb. 25, 2010

(51) Int. Cl.
*B23B 17/00* (2006.01)
*B27C 7/06* (2006.01)

(52) U.S. Cl. .......................................... 82/117; 82/148

(58) Field of Classification Search .................... 62/142, 62/148, 149, 150, 151, 162, 165, 166, 170; 82/142, 148, 149, 150, 151, 162, 165, 166, 82/170

See application file for complete search history.

(56) References Cited

U.S. PATENT DOCUMENTS

| | | | | |
|---|---|---|---|---|
| 1,528,971 | A * | 3/1925 | Groene | 82/117 |
| 1,600,401 | A * | 9/1926 | Cockburn | 82/132 |
| 2,049,191 | A * | 7/1936 | Bouget et al. | 83/748 |
| 2,697,500 | A * | 12/1954 | Klopp | 192/215 |
| 2,700,912 | A * | 2/1955 | Hardy | 82/146 |
| 2,885,897 | A * | 5/1959 | Pettigrew | 474/27 |
| 3,410,326 | A * | 11/1968 | Lionil | 144/1.1 |
| 3,618,432 | A * | 11/1971 | Briese | 82/117 |
| 5,008,828 | A * | 4/1991 | Pinard et al. | 700/186 |
| 6,561,062 | B2 * | 5/2003 | Miller | 82/115 |
| 7,874,234 | B2 * | 1/2011 | Clay | 82/149 |

* cited by examiner

*Primary Examiner* — Will Fridie, Jr.

(74) *Attorney, Agent, or Firm* — Alan Kamrath; Kamrath & Associates PA

(57) ABSTRACT

A wood working lathe includes a granite lathe bed including a guiding rail extending thereon longitudinally and an opening vertically formed through an end thereof, with the opening in communication with the guiding rail. A driving unit is installed to the lathe bed. A granite fixed stock is disposed on the end of the lathe bed relative to the opening of the lathe bed and includes a driven unit inserted therethrough axially and a compartment formed therein and in communication with the driven unit. The driving unit drives the driven unit to turn through the compartment. A granite foot stock is slidably installed on another end of the lathe bed and includes a positioned member for selectively fixing the foot stock to the lathe bed and a feeding device. An axis of the feeding device is coaxial with an axis of the driven unit, with cooperation of the driven unit and the feeding device adapted for clamping works to be turned.

8 Claims, 3 Drawing Sheets

WOOD WORKING LATHE

BACKGROUND OF THE INVENTION

1. Field of the Invention

The present invention relates to a wood working lathe.

2. Description of the Related Art

A conventional wood working lathe is usually made of metal material like cast-iron, die-cast aluminum and so on. No matter which metal material the wood working lathe is made of, the shortcomings of the metal wood working lathe are instability and properties of wear resistance. Therefore, this kind of wood working lathe is easy to be influenced via temperature and humidity. It causes higher cost of maintenance.

Moreover, during long-time use of the wood working lathe, the degree of deformation of the bed rails disposed on the wood working lathe would be increased to influence processing accuracy and tilt the location of the lathe center. Further, wood pellets easily enter the transmission case of the wood working lathe as to influence operation of the wood working lathe. Therefore, it is troublesome to clean the transmission case of the wood working lathe frequently.

The present invention is therefore intended to obviate or at least alleviate the problems encountered in the prior art.

SUMMARY OF THE INVENTION

Referring to this state of the art, it is an object of the present invention to improve a guiding rail of a lathe bed of a wood working lathe, with the deformation of the guiding rail being minimized during use. The deformation of the granite guiding rail is one quarter of the deformation of a cast-iron guiding rail of a conventional lathe bed approximately. Moreover, the deviation between lathe centers of the fixed and foot stocks of the wood working lathe is 0.01 meters approximately.

Another object of the present invention is that active and passive wheels of the base and fixed stocks of the wood working lathe are respectively provided inside of the base and fixed stocks. Hence, it can avoid wood pellets produced from cutting wood to influence the operation of the active and passive wheels for increasing the efficiency of the wood working lathe.

Yet another object of the present invention is that the foot stock and a tool stock are respectively allowed to fix on the lathe bed or slide along the guiding rail of the lathe bed alternatively via positioned members.

Other objects and advantages of the present invention will be set forth in part in the description and in the drawings which follow and, in part, will be obvious from the description or may be learned by practice of the invention.

BRIEF DESCRIPTION OF THE DRAWINGS

The present invention will be described via detailed illustration of the preferred embodiment referring to the drawings.

BRIEF DESCRIPTION OF THE DRAWINGS

Figure 1:
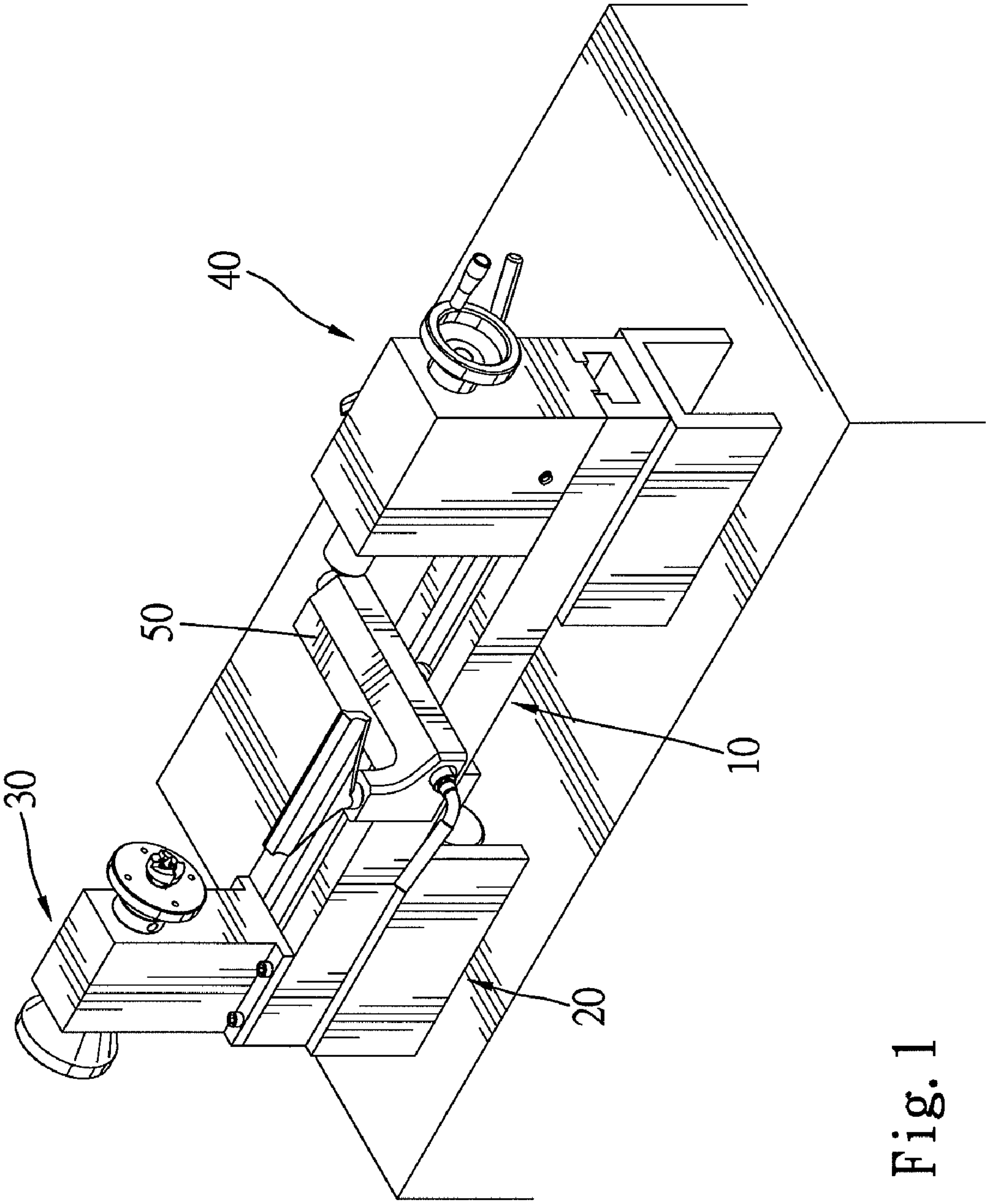
FIG. 1 is a perspective view of a wood working lathe according to the preferred embodiment of the present invention.
Figure 2:
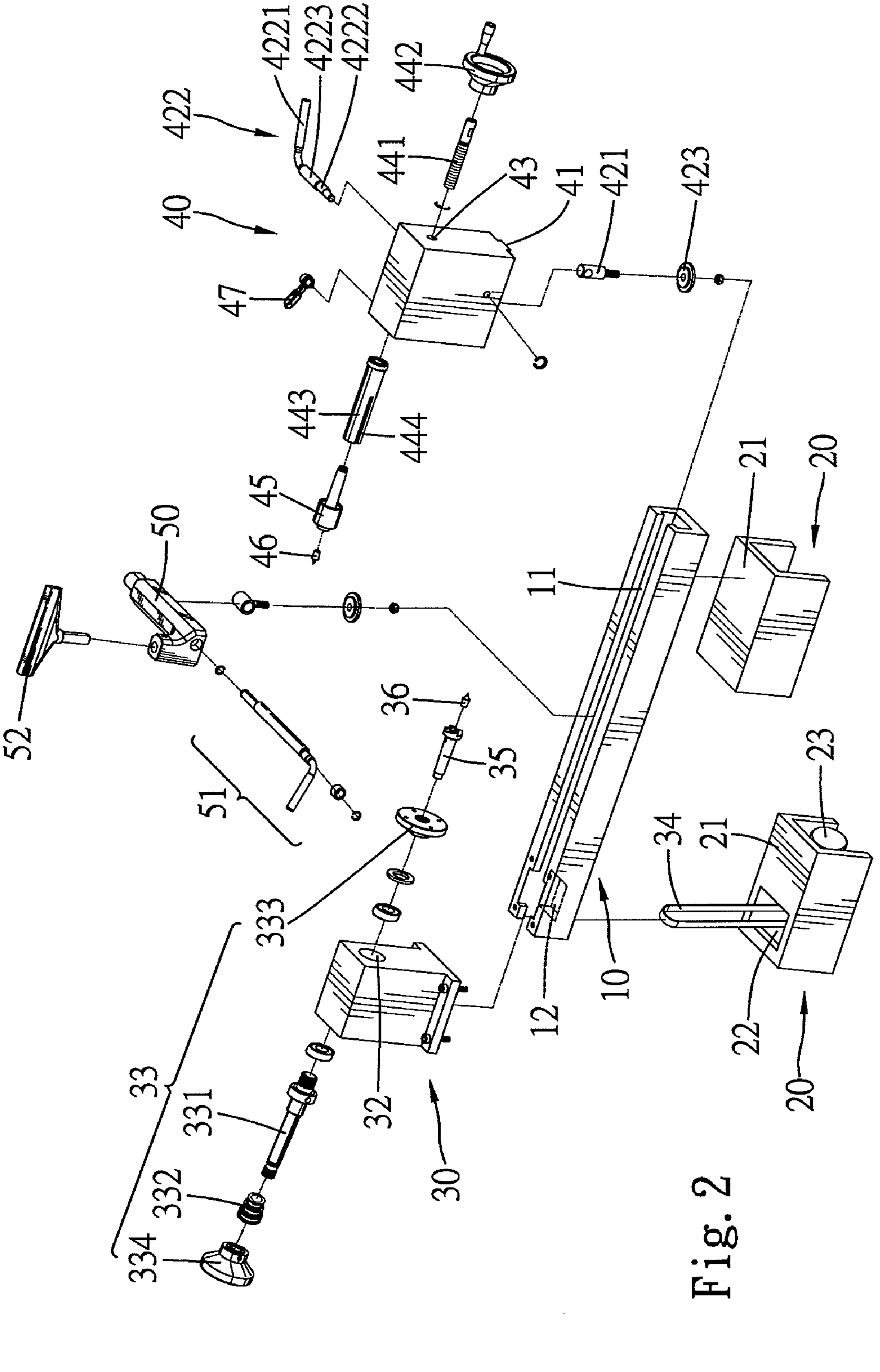
FIG. 2 is an exploded view of the wood working lathe shown in FIG. 1.
Figure 3:
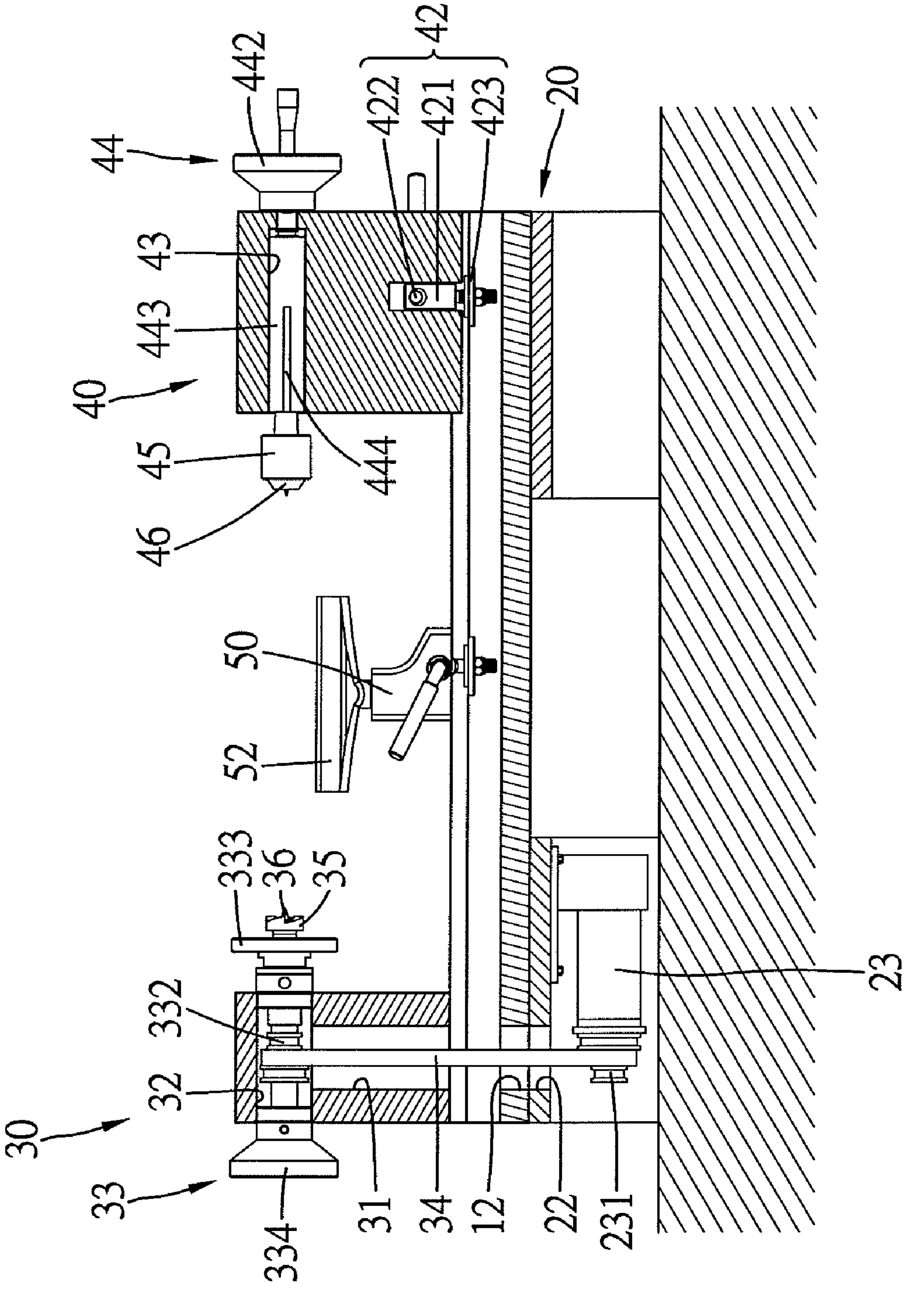
FIG. 3 is a side, cross-section view of the wood working lathe shown in FIG. 1.

Referring to FIGS. 1 through 3, a wood working lathe is substantially made of granite and includes a lathe bed 10 having first and second ends, two base stocks 20, a fixed stock 30 and a foot stock 40. The base stocks 20 are respectively installed to the first and second ends of the bottom of the lathe bed 10 for supporting the lathe bed 10. The fixed and foot stocks 30 and 40 are respectively installed to the first and second ends of the top of the lathe bed 10 and relative to the base stocks 20. The fixed stock 30 is fixed to the lathe bed 10, and the foot stock 40 is slidably disposed on the lathe bed 10. Cooperation of the fixed and foot stocks 30 and 40 is adapted for positioning works on the wood working lathe. A tool stock 50 is slidably disposed between the fixed and foot stocks 30 and 40 for cutting the works.

The lathe bed 10 includes a guiding rail 11 extending thereon longitudinally and having an upward opening (not numbered) and an opening 12 vertically formed through the first end thereof, with the opening 12 in communication with the guiding rail 11.

Each base stock 20 is an inverted U-shape and includes a support surface 21 for steadily supporting the lathe bed 10 on the base stocks 20 and an opening 22 formed on the related base stock 20 that is installed to the first end of the lathe bed 10, with the opening 22 corresponding to the opening 12 of the lathe bed 10. However, in an alternative embodiment, it is possible that the base stocks 20 are integrally installed to the lathe bed 10. A driving unit 23 is disposed in the related base stock 20 that is installed to the first end of the lathe bed 10 and includes an active wheel 231 provided with respect to the openings 12 and 22 of the lathe bed 10 and the base stock 20 that is installed to the first end of the lathe bed 10.

Referring to FIG. 3, the fixed stock 30 is fixed to the first end of the top of the lathe bed 10 and above the opening 12 of the lathe bed 10 exactly. A compartment 31 which is formed in the fixed stock 30 longitudinally is provided to open toward the openings 12 and 22 of the lathe bed 10 and the base stock 20 installed to the first end of the lathe bed 10. A through-hole 32 is formed through the fixed stock 30 transversely and parallel to the direction of the guiding rail 11. The through-hole 32 communicates with the compartment 31. The openings 12 and 22 and the compartment 31 are in communication with one another in a straight direction. A driven unit 33 is disposed through the through-hole 32 and includes a main shaft 331, a passive wheel 332 and first and second disks 333 and 334. The main shaft 331 is inserted through the fixed stock 30 axially via the through-hole 32. The passive wheel 332 is mounted on the main shaft 331. The first and second disks 333 and 334 are respectively provided on two sides of the fixed stock 30 and engaged with two ends of the main shaft 331. The active wheel 231 drives the passive wheel 332 via a driven belt 34 so that the driving unit 23 drives the main shaft 331 to turn. A clamping element 35 is connected to an end of the main shaft 331 toward the foot stock 40. A lathe center 36 is coupled to the distal end of the clamping element 35.

The foot stock 40 is disposed on the top of the second end of the lathe bed 10 and slidably along the guiding rail 11 via a sliding portion 41, with the sliding portion 41 provided on the bottom of the foot stock 40. A positioned member 42 is adapted for fixing the foot stock 40 onto the lathe bed 10 or allowing the foot stock 40 to slide on the lathe bed 10, alternatively. The positioned member 42 includes a positioned shaft 421 perpendicular to the lathe bed 10 and a lever 422 adapted for controlling the positioned shaft 421 to move with respect the lathe bed 10 upward/downward. The lever 422 has first and second ends 4221 and 4222, with the first end 4221 being perpendicular to the second end 4222 approximately. The second end 4222 of the lever 422 is inserted through the foot stock 40 and an end of the positioned shaft 421. The positioned shaft 421 is disposed inside of the foot stock 40, with the second end 4222 of the lever 422 being perpendicular to the guiding rail 11 of the lathe bed 10. Another end of the positioned shaft 421 is inserted into the guiding rail 11 and engaged with a limited disk 423 as to limit the limited disk 423 in the guiding rail 11. A coupled portion 4223 is provided on the second end 4222 of the lever 422, with the section of the coupled portion 4223 being oval-shaped. In use, the first end 4221 of the lever 422 is operated, and, then, the coupled portion 4223 biases the positioned shaft 421 to slightly move with respect the lathe bed 10 upward/downward. When the positioned shaft 421 moves with respect the lathe bed 10 upward, the foot stock 40 is fixed on the lathe bed 10. When the positioned shaft 421 moves with respect the lathe bed 10 downward, the foot stock 40 is allowed to slide along the guiding rail 11 via the sliding portion 41.

A through-hole 43 is formed through the foot stock 40 transversely and parallel to the direction of the guiding rail 11. A feeding device 44 is disposed through the through-hole 43 and includes a threaded shaft 441, a hand wheel grip 442 and a tool sheath 443. The threaded shaft 441 is inserted through the foot stock 40 axially via the through-hole 43. The wheel grip 442 is fixed to an end of the threaded shaft 441 opposite to the fixed stock 30. The tool sheath 443 is disposed in the foot stock 40 and engaged with another end of the threaded shaft 441. The wheel grip 442 is operated for driving the threaded shaft 441 to adjust the location of the tool sheath 443 with respect to the threaded shaft 441. A positioned element 47 is selectively abutted against the tool sheath 443 via a limited slot 444 that is formed on the tool sheath 443 as to selectively prevent the threaded shaft 441 and the wheel grip 442 from turning relative to the tool sheath 443. A clamping element 45 is connected to the threaded shaft 441 toward the fixed stock 30. A lathe center 46 is coupled to the distal end of the clamping element 45. The lathe centers 36 and 46 of the fixed and foot stocks 30 and 40 are provided in a straight direction parallel to the guiding rail 11 of the lathe bed 10 and adapted for clamping the works to be turned.

The tool stock 50 is in a form of an L-shape and disposed on the lathe bed 10 transversely. A fixed element 51 is adapted for fixing the tool stock 50 onto the lathe bed 10 or allowing the tool stock 50 to slide on the lathe bed 10, alternatively. A tool rest 52 is inserted to the tool stock 50, with an axis of the tool rest 52 spaced from and parallel to an axis of the lathe bed 10. In use, a user's hand can put on the tool rest 52.

In the present invention, the lathe bed 10, the base, and the fixed and foot stocks 20, 30 and 40 are all made of granite. In addition, the tool stock 50 can also be made of granite. Therefore, it can minimize the deformation of the guiding rail 11 during use. The deformation of the granite guiding rail 11 is one quarter of the deformation of the conventional cast-iron guiding rail of the lathe bed approximately. Also, the deviation between the lathe centers 36 and 46 of the fixed and foot stocks 30 and 40 is 0.01 meters approximately.

Granite is a common and widely occurring type of intrusive, felsic, igneous rock. Granite has a medium to coarse texture, occasionally with some individual crystals larger than the groundmass forming a rock known as porphyry. Granite is nearly always massive (lacking internal structures), hard and tough, and therefore, it has gained widespread use as a construction stone. The average density of granite is 2.75 $g/cm^3$.

Granite is a highly durable siliceous stone. Compared to marble, it is more resistant to the acids found in lemons, vinegars, and cleaning products and usually will not etch. It is an easy stone to live with.

Granite characteristics make this stone virtually scratch proof. It will not scratch even when directly cut on. Things such as keys, coins, utensils, and appliances won't scratch it either.

The characteristics of granite also make this stone heat resistant. It can withstand heat up to 1200 degrees Fahrenheit. There are no worries about any burn or char marks.

Another granite characteristic is the lower water absorption rate when compared to marble and limestones.

Furthermore, the compartment 31 is in communication with the driven unit 33 inside of the fixed stock 30. Also, the active and passive wheels 231 and 332 are respectively provided inside of the base and fixed stocks 20 and 30. Hence, it can avoid wood pellets produced from cutting wood to influence the operation of the active and passive wheels 231 and 332 for increasing the efficiency of the driving unit 23 and the driven unit 33. Moreover, granite can prevent the temperature of the wood working lathe from increasing and avoid burning users.

What is claimed is:

1. A wood working lathe comprising:

a lathe bed including a guiding rail extending thereon longitudinally and an opening vertically formed through an end thereof, with the opening in communication with the guiding rail, with the lathe bed being made of granite for minimizing deformation of the guiding rail during use;

a driving unit installed to the lathe bed;

a granite fixed stock disposed on the end of the lathe bed relative to the opening of the lathe bed and including a driven unit inserted therethrough axially and a compartment formed therein and in communication with the driven unit, with the driving unit driving the driven unit to turn through the compartment;

a granite foot stock slidably installed on another end of the lathe bed and including a positioned member for selectively fixing the foot stock to the lathe bed and a feeding device, with an axis of the feeding device being coaxial with an axis of the driven unit, with cooperation of the driven unit and the feeding device adapted for clamping works and preventing wood pellets from influencing operation of the driving unit; and two base stocks installed to the two ends of the lathe bed and relative to the fixed and foot stocks, respectively, with one of the two base stocks having an opening corresponding to the opening of the lathe bed.

2. The wood working lathe as claimed in claim 1, with the driving unit disposed in the one of the two base stocks; wherein the driven unit includes a passive wheel relative to the compartment of the fixed stock and the driving unit includes an active wheel corresponding to the passive wheel, with the active wheel driving the passive wheel via a driven belt.

3. The wood working lathe as claimed in claim 2, with the driven unit having a main shaft inserted through the fixed stock axially, with the passive wheel mounted on the main shaft.

4. The wood working lathe as claimed in claim 3, wherein the fixed stock further comprises a clamping element connected to an end of the main shaft toward the foot stock and a lathe center coupled to a distal end of the clamping element; wherein the foot stock further comprises a clamping element toward the fixed stock and a lathe center coupled to a distal end of the clamping element of the foot stock, with the lathe centers of the fixed and foot stocks provided in a straight direction parallel to the guiding rail.

5. A wood working lathe comprising:

a lathe bed including a guiding rail extending thereon longitudinally and an opening vertically formed through an end thereof, with the opening in communication with the guiding rail, with the lathe bed being made of granite for minimizing deformation of the guiding rail during use;

a driving unit installed to the lathe bed;

a granite fixed stock disposed on the end of the lathe bed relative to the opening of the lathe bed and including a driven unit inserted therethrough axially and a compartment formed therein and in communication with the driven unit, with the driving unit driving the driven unit to turn through the compartment;

a granite foot stock slidably installed on another end of the lathe bed and including a positioned member for selectively fixing the foot stock to the lathe bed and a feeding device, with an axis of the feeding device being coaxial with an axis of the driven unit, with cooperation of the driven unit and the feeding device adapted for clamping works and preventing wood pellets from influencing operation of the driving unit, wherein the feeding device includes a threaded shaft inserted through the foot stock axially, a hand wheel grip fixed to an end of the threaded shaft opposite to the fixed stock and a tool sheath disposed in the foot stock and engaged with another end of the threaded shaft, wherein the foot stock further comprises a clamping element and a lathe center coupled to a distal end of the clamping element, with the clamping element of the foot stock connected to the threaded shaft toward the fixed stock, with the fixed stock including a clamping element toward the foot stock and a lathe center coupled to a distal end of the clamping element of the fixed stock, with the lathe centers of the fixed and foot stocks provided in a straight direction parallel to the guiding rail; and a positioned element selectively abutted against the tool sheath via a limited slot formed on the tool sheath as to selectively prevent the threaded shaft and the hand wheel grip from turning relative to the tool sheath.

6. The wood working lathe as claimed in claim 1, further comprising a tool stock slidably disposed between the fixed and foot stocks for cutting the works and including a tool rest inserted thereto, with an axis of the tool rest spaced from and parallel to an axis of the lathe bed.

7. A wood working lathe comprising:

a lathe bed including a guiding rail extending thereon longitudinally and an opening vertically formed through an end thereof, with the opening in communication with the guiding rail, with the lathe bed being made of granite for minimizing deformation of the guiding rail during use;

a driving unit installed to the lathe bed;

a granite fixed stock disposed on the end of the lathe bed relative to the opening of the lathe bed and including a driven unit inserted therethrough axially and a compartment formed therein and in communication with the driven unit, with the driving unit driving the driven unit to turn through the compartment; and a granite foot stock slidably installed on another end of the lathe bed and including a positioned member for selectively fixing the foot stock to the lathe bed and a feeding device, with an axis of the feeding device being coaxial with an axis of the driven unit, with cooperation of the driven unit and the feeding device adapted for clamping works and preventing wood pellets from influencing operation of the driving unit, wherein the positioned member includes a positioned shaft and a lever adapted for controlling the positioned shaft to move with respect the lathe bed upward or downward, with the lever inserted through the foot stock and an end of the positioned shaft, with another end of the positioned shaft inserted into the guiding rail and engaged with a limited disk.

8. The wood working lathe as claimed in claim 7, further comprising a coupled portion provided on the lever, with a section of the coupled portion being oval-shaped to bias the positioned shaft to slightly move with respect to the lathe bed upward or downward.

* * * * *